Dec. 28, 1937.   R. S. SANFORD   2,103,274
CONTROL MECHANISM
Filed Dec. 29, 1936    3 Sheets-Sheet 3

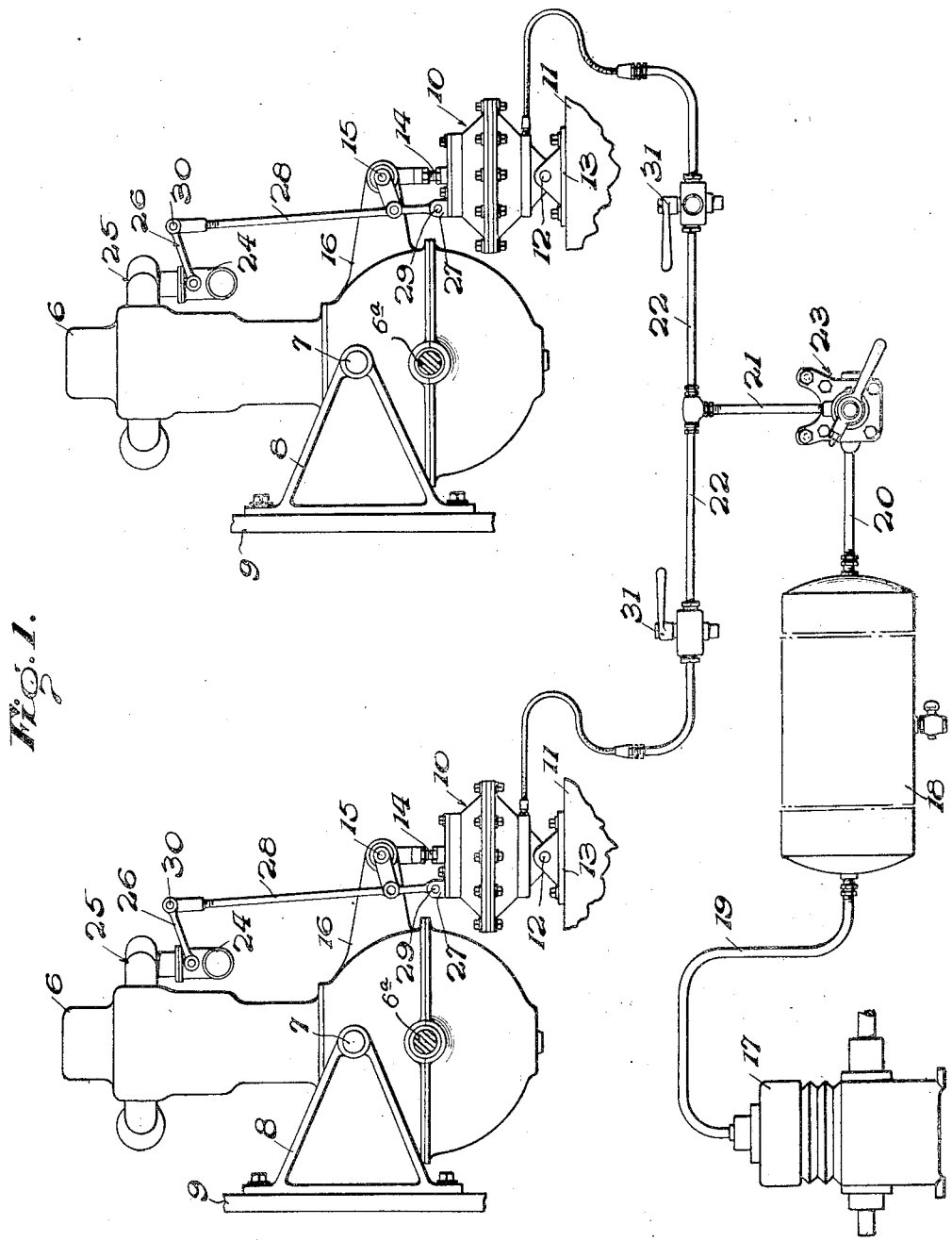

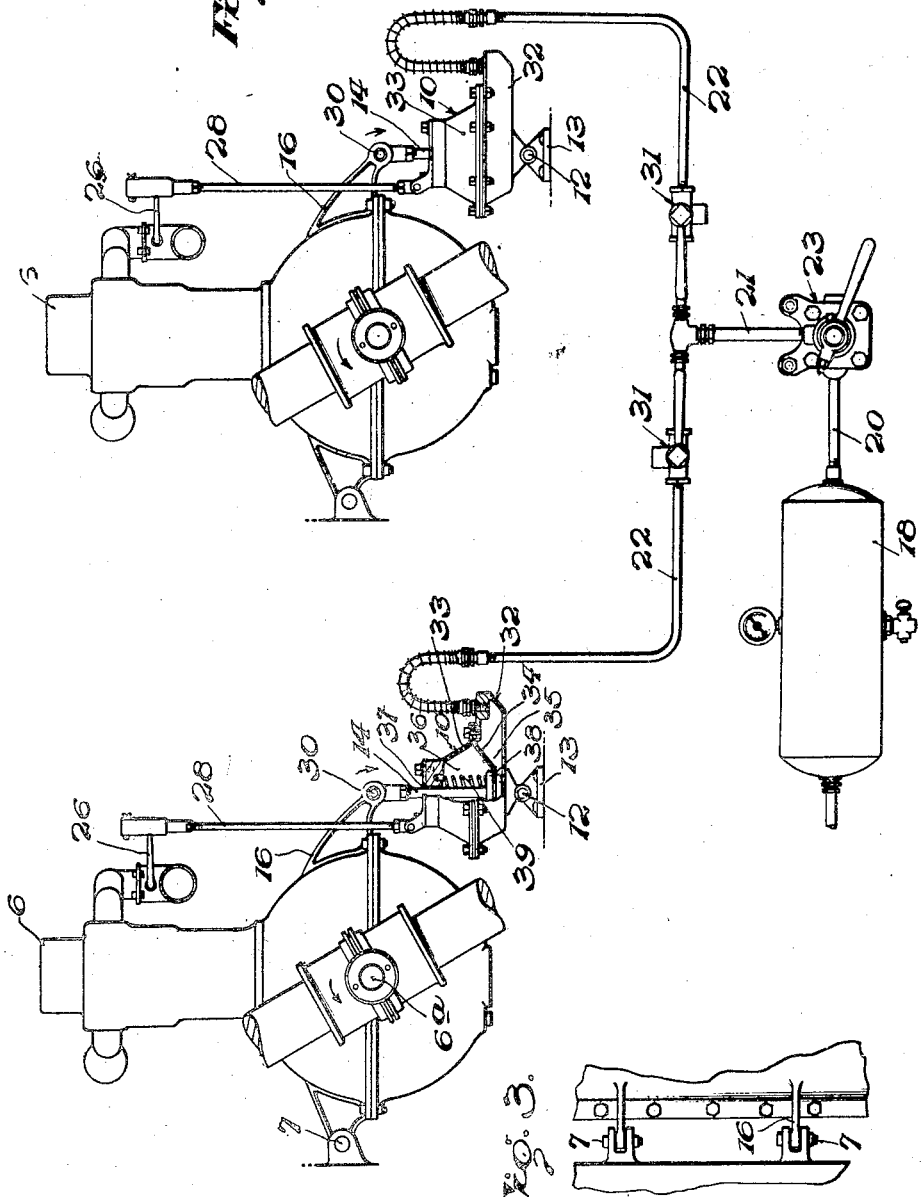

INVENTOR
Roy S. Sanford
BY
ATTORNEY

Patented Dec. 28, 1937

2,103,274

UNITED STATES PATENT OFFICE 2,103,274

CONTROL MECHANISM

Roy S. Sanford, New York, N. Y., assignor to Bendix-Westinghouse Automotive Air Brake Company, Pittsburgh, Pa., a corporation of Delaware Application December 29, 1936, Serial No. 118,173

15 Claims. (Cl. 60—97)

This invention deals in general with torque controlling means for engines, and more particularly with mechanisms for automatically maintaining the torque of one or more internal combustion engines constant in correspondence with the setting of a control member.

It has previously been proposed to accomplish such control through the medium of transmission dynamometers inserted in the transmission shafts leading from the engines to the propelling means, but these attempts have resulted in costly and complicated mechanisms whose sensitivity has been limited by excessive friction in the control parts and particularly in the transmission dynamometer, thus causing the engine control to be erratic.

It is therefore an object of the present invention to provide a simplified engine torque control wherein unnecessary mechanism is eliminated and the control is directly responsive to the torque reaction of the engine.

A further object is to provide engine torque control means adapted to maintain the torque of a plurality of engines constant regardless of varying speeds.

Still another object is to provide a torque control system for an internal combustion engine wherein variation in engine torque acts to vary the flow of fuel to the engine.

Yet another object is to provide a torque control for a plurality of engines adapted to maintain the torque of the engines constant regardless of their relative efficiencies.

These and other objects of the invention will be more readily understood when considered in connection with the drawings and the following description. It is to be expressly understood, however, that the drawings are for the purpose of illustration only, and it is not intended that they shall constitute a definition of the limits of the invention, reference being had for this purpose to the appended claims.

Referring to the drawings, wherein similar reference numerals refer to similar parts in the different views:

Fig. 1 is a diagrammatic view of a pair of engines and a control system therefor constructed in accordance with the principles of the invention;

Fig. 2 shows a modified arrangement of the system partially in section, as applied to an airplane;

Fig. 3 is a detail view of an engine mounting;

Figure 5:
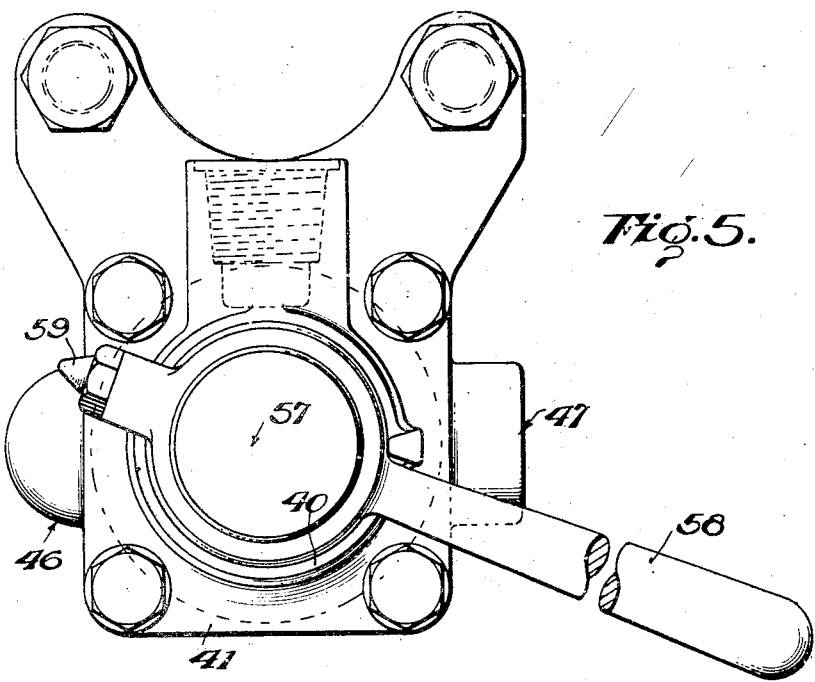
Fig. 5 is a plan view of the control valve.

Referring to Fig. 1, the invention in general includes a plurality of engines 6 pivotally mounted on trunnions 7 suitably carried by engine mounting brackets 8 which are bolted or otherwise attached to vehicle frame members 9. Fluid pressure actuators 10, pivotally attached to frame members 11, as by means of pins 12 and brackets 13, are provided with piston rods 14 which are connected to the engines through pins 15 and engine torque arms 16, the actuators being supplied by fluid pressure from compressor 17 and reservoir 18 through conduits 19, 20, 21 and 22. A control valve 23 of the self-lapping type is associated with conduits 20 and 21 for controlling the pressure of fluid in the actuators 10 as will be further described hereinafter. Fuel is supplied to the engines by carburetors 24 connected thereto as by means of intake manifolds 25, the flow of fuel to the carburetors being variable by movement of throttle levers 26, which are connected to brackets 27 on actuators 10 by means of throttle lever actuating rods 28 and pivot pins 29 and 30 respectively. Shut-off valves 31 are associated with conduits 32 in order that either engine may be shut off, as will be explained hereinafter.

It is well established that engines of the internal combustion type tend to have a torque reaction in a direction opposite to the direction of crank shaft rotation, and, in the present invention, this reaction is used in controlling the throttle opening of the engines in such a way that the torque of one or more engines may be maintained constant.

Before explaining the operation of the control mechanism which is the subject of this invention, attention is directed to Fig. 2, wherein the power actuator is disclosed as comprising a cover plate 32 pivotally attached by means of pivot pin 12, to bracket 13 and forming, in connection with a casing 33 and a flexible diaphragm 34 clamped therebetween, a fluid pressure chamber 35 communicating with conduit 20 and an atmospheric chamber 36 communicating with atmosphere by means of bore 37. The piston rod 14 carries a plate 38 at one end held against diaphragm 34 by a relatively light spring 39 interposed under tension between the casing 33 and the said plate, the latter being connected at its other end to engine 6 by means of the torque arm 16 and pivot pin 30. It will be readily apparent that, upon admission of fluid under pressure to the chamber 35 of actuator 10, the diaphragm will tend to turn the engine 6 about pivots 7 in a counterclockwise direction through its action on piston rod 14 by plate 38 and the action of rod 14 on torque arm 16 through pivot pin 30, for reasons to be hereinafter described.

Figure 4:
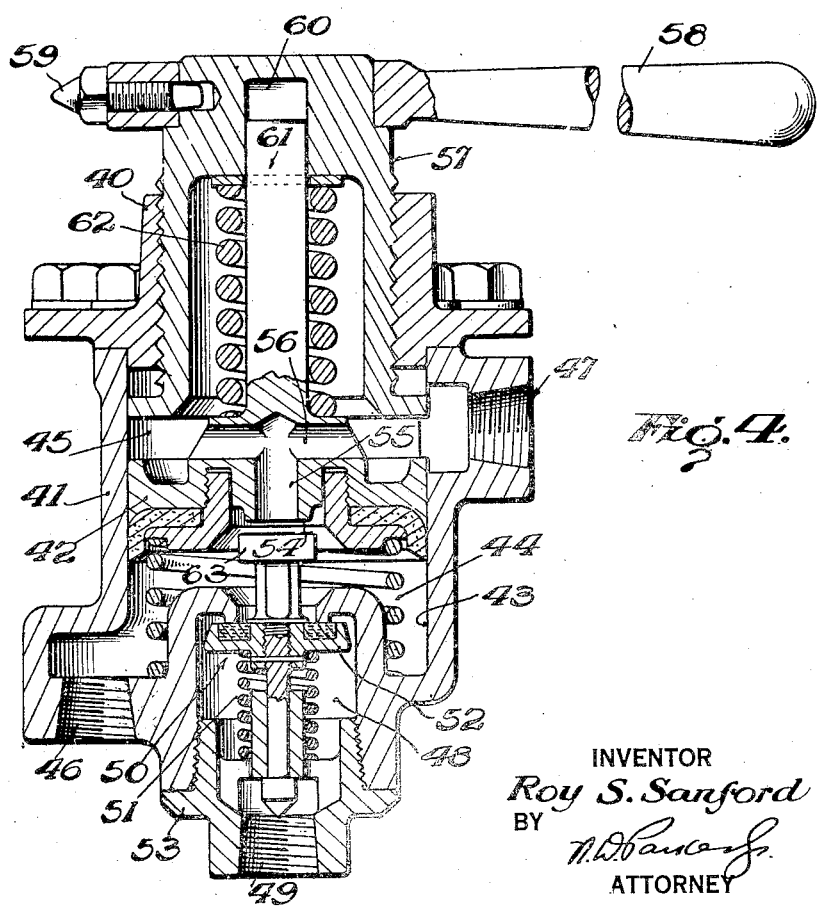
Fig. 4 is a view partially in section of a control valve used in the system.

Referring now to the control valve 23 as disclosed in detail in Fig. 4, it will be noted that the valve is of the so-called self-lapping type, differing only in detail from a similar valve disclosed in Sanford application Serial No. 101,130, filed September 16, 1936. As shown, the valve comprises upper and lower casing sections 40 and 41 having a pressure responsive member such as piston 42 slidably mounted in a cylindrical bore 43 of said casing and dividing the interior of the casing sections into an outlet chamber 44 and an exhaust chamber 45. The outlet chamber 44 is provided with an outlet port 46 and the exhaust chamber 45 is provided with an exhaust port 47, the port 46 being connected with conduit 22 and the port 47 being connected to atmosphere. The lower casing section 41 is also provided with an intake chamber 48 communicating with reservoir 18 through port 49 and conduit 20.

In order to control the flow of fluid pressure from the intake chamber 48 to the outlet chamber 44 and to the exhaust chamber 45, a combined inlet and exhaust valve assembly 50 is provided which is normally urged to the position shown as by means of a spring 51 interposed between intake valve 52 and cap nut 53. In this position, the flow of fluid pressure from inlet chamber 48 to outlet chamber 44 is prevented by intake valve 52 which is closed.

The piston 42 is provided at its lower end with an exhaust valve seat 54 and ports 55 and 56 which, when the exhaust valve seat 54 is uncovered, connect the outlet chamber 44 to the atmosphere. The upper casing section 40 is closed at the top by a hollow sleeve 57 threadedly received in said casing, an operating handle 58 being attached to said sleeve by set screw 59, the sleeve 57 having a bore 60 adapted to receive and guide the stem 61 of piston 42. Interposed between the piston 42 and the lower face of hollow sleeve 57 is a graduating spring 62.

It will be noted that the upper end of valve assembly 50 carries an exhaust valve portion 63 normally in spaced relation to exhaust valve seat 54 but adapted on downward movement of the piston 42 to engage the valve seat 54 and prevent the exhaust of fluid pressure from chamber 44.

With a construction of the above character, it will be noted that, with the valve parts in the normal position shown in the drawings, the actuator 10 of Fig. 1 which is connected to port 46 of the control valve 23 through conduit 22, normally open valve 31 and conduit 21 will be cut off from reservoir 18 by means of closed intake valve 52 but will be connected to atmosphere through conduit 22, valve 31, conduit 21 and thence through outlet chamber 44, ports 55 and 56, exhaust chamber 45 and exhaust port 47. If, however, the sleeve 57 is rotated by handle 58 in threaded casing 40, the sleeve is moved downwardly, compressing the spring 62 sufficiently to move the piston 42 downwardly to a point where exhaust valve seat 54 contacts exhaust valve 63, and, with the parts in this position, the actuator 10 will be disconnected both from atmosphere and from reservoir 18. If it is now desired to conduct fluid pressure from reservoir 18 to actuator 10, further downward movement of sleeve 57 will further compress spring 62 to move piston 42 downwardly, thus opening intake valve 63 and admitting fluid pressure to outlet chamber 44, from which it flows to actuator 10 through conduits 21 and 22 and associated open valve 31. When the fluid pressure force acting upwardly on the piston 42 is sufficient to overbalance the downward force of spring 62, the piston 42 will move upwardly to a point where valves 52 and 63 are both closed, and a constant pressure determined by the degree of compression of spring 62 will be maintained in actuator 10. In like manner, a reduction in pressure in actuator 10 may be obtained by rotating sleeve 57 in the reverse direction, thus lessening the compression of said spring and exhausting fluid under pressure from the actuator until a new condition of balance at a lower pressure is obtained in the manner hereinbefore described.

Referring now to the operation of the control system and more particularly to its operation in controlling one of the engines in Fig. 1, consider for example that the crankshaft 6a of engine 6 is to rotate in a counterclockwise direction, the parts as shown in the drawings being in a position where the throttle operated through lever 26 is closed to allow the motor to operate at idling speed. If the control valve 23 is now operated to allow the establishment of a predetermined pressure in the actuator 10, the piston rod 14 will move upwardly and will move engine 6 in a counterclockwise direction about pivots 7 through its connection with torque arm 16, and throttle lever 26 will move downwardly toward open position by virtue of its connection through rod 26 to bracket 27 of actuator 10. The engine will immediately speed up, and since, as previously stated, it is well known that the torque reaction of an engine is opposite from the direction of crankshaft rotation, it will be evident that, as the engine speeds up, the torque reaction will increase and tend to force piston rod 14 downwardly, and at the same time will tend to move the throttle lever 26 toward closed position, thus lessening the supply of fuel to the engine to a point where the torque reaction force downward is balanced by the upward force exerted by actuator 10 on rod 14. It is to be noted that, when this action occurs, the control valve 23 is so constructed that fluid compressed in the actuator is exhausted at substantially constant pressure through the valve.

It will be readily seen from the foregoing description that the degree of throttle opening of the engine is responsive to the torque reaction of the engine, and that any change in the torque output of the engine will automatically vary the throttle setting to maintain the engine torque at a constant value. For example, if the torque output of the engine falls off due to leaking valves or any other defect which would lower the efficiency of the engine, the torque reaction of the engine will no longer balance the counter-reaction of the actuator 10 on torque arm 16, and the engine will be rotated in a counterclockwise direction about pivots 7, thus opening the throttle through relative movement of the engine and throttle lever 26. In this case, the constant torque will be maintained, but with a larger throttle opening and a higher engine speed. Since the torque developed by the engine is shown to be proportioned to the pressure in actuator 10, it will be readily seen that variation of the fluid pressure in the actuator will vary the engine torque, and that, consequently, any predetermined setting of the control valve 23 will cause the engine to maintain a corresponding torque output.

While the operation of the control system has been described in connection with a single engine, further reference to Fig. 1 will show that with both of the valves 31 in open position the torques of two engines connected to the same or different driven devices may be maintained at an equal value determined by the setting of the single control valve 23. In like manner, the torque of any number of engines may be controlled from a single station and by a single control valve.

Referring to the mounting of the engines in Fig. 1, engine pivot points 7 are located so as to pass through the center of gravity of the engines, preferably on a line parallel to the engine crankshaft. With engines mounted in this manner on a vehicle, movement of the vehicle in a curved path will have no effect on the throttle settings of the engines, since centrifugal forces acting on the engines will have no tendency to rotate them about their pivotal mountings. It will be apparent, however, that, under conditions where centrifugal forces are not present, the engines may be pivoted about other axes without affecting satisfactory operation of the control system. Where the driven devices are remotely located rather than mounted directly on the engine crankshaft, universal joint connections will be required to allow for the rotation of the engines about their mountings.

While two embodiments of the invention have been shown and described herein, it is to be understood that the invention is not limited thereto but may be embodied in various other forms, as well understood by those skilled in the art, without departing from the spirit of the invention. Reference will therefore be had to the appended claims for a definition of the limits of the invention.

What is claimed is:

1. A control system for an engine comprising pivotal mounting means therefor, control means for said engine, power means for rotating the engine about said pivotal mounting means, control means for said power means, and means responsive to relative movement of said engine and mounting means to vary the action of said second named means.

2. A control system for an engine comprising pivotal mounting means therefor, control means for said engine, power means for rotating the engine about said pivotal mounting means, remote control means for said power means, and means responsive to relative movement of said engine and mounting means to vary the action of said second named means.

3. A control system for a plurality of engines comprising pivotal mounting means for said engines, individual control means for said engines, individual power means for rotating said engines about their pivotal mountings, common control means for said power means, and means associated with each engine and mounting and responsive to relative movements of each engine relative to its mounting to vary the action of said individual control means.

4. A control system for an engine comprising pivotal mounting means therefor, control means for said engine, an actuator for rotating said engine about said pivotal mounting, a source of power including connecting means to said actuator, control means associated with said connecting means for controlling the operation of said actuator, and means operative upon relative movement of said engine and mounting means to vary the setting of said first named control means.

5. A control system comprising an engine, pivotal mounting means therefor, an engine controlling element, a fluid pressure actuator for rotating the engine about said mounting means, a source of fluid pressure including a connection to said actuator, valvular means associated with said source for controlling the application of fluid pressure to said actuator, and means operative in response to relative movement of said engine and mounting means to vary the position of said element.

6. In a torque control system for an engine, mounting means for said engine so constituted that the engine may move in one direction in response to torque reaction, power means including a control device therefor for adjustably resisting such movement, and means including an engine control element and responsive to said engine movements for changing the setting of said element.

7. In a torque control system for an engine, pivotal mounting means for said engine so constituted that the engine may rotate thereon due to torque reaction, a fluid pressure actuator interposed between said engine and mounting means and adapted to oppose said reaction, a source of fluid pressure for said actuator, valvular means for establishing and maintaining a predetermined fluid pressure in said actuator, and means including an engine control element operative in response to relative movement of said engine and mounting to control the flow of motive fluid to said engine, whereby the torque developed by said engine is maintained substantially proportional to the fluid pressure in said actuator.

8. The combination with an engine having a pivotal mounting, of a power actuator associated with said engine and mounting to oppose movement of said engine about said mounting due to torque reaction of the engine, means for controlling the power of said actuator, and means associated with said engine and mounting and controlling the flow of motive fluid to said engine whereby the torque of said engine will be maintained substantially proportional to the power applied to said actuator.

9. In a control system for an engine of the type having an inlet passage for motive fluid and a throttle valve associated therewith, pivotal mounting means for said engine, power means for rotating said engine thereon, control means therefor, and means responsive to relative movement of said engine and mounting means for varying the opening of said throttle valve.

10. In a control system for an engine of the type having an inlet passage for motive fluid and a throttle valve associated therewith, pivotal mounting means for said engine, a power actuator for opposing the torque reaction of said engine about said mounting, control means for said actuator, and motor control means associated with said engine and mounting and operable on relative movement thereof to vary the flow of motive fluid to said engine.

11. A control system for an engine including pivotal mounting means therefor, power means interposed between said engine and mounting means, control means for said power means, and means responsive to the torque reaction of the engine and to the action of the power means for controlling the flow of motive fluid to the engine.

12. In combination with an engine having pivotal mounting means and adapted for rotation thereon due to torque reaction, power means interposed between said engine and mounting, control means for said engine, control means for said power means, and connections between said engine control means and mounting and responsive to relative movements thereof for controlling the power of the engine.

13. The method of maintaining substantially constant the torques of a plurality of engines which comprises varying the fuel supplied the engines in accordance with variations in their torque reactions.

14. In combination with an engine having a fluid pressure support, a fuel control element, and means for varying the position of said element in accordance with variations in the pressure in said support in response to variations in the torque reaction of said engine.

15. In combination with an engine having a speed controlling element, means for mounting said engine permitting movement of the latter in response to variations in torque reaction, and means for actuating said element in accordance with the said movement of the engine.

ROY S. SANFORD.